June 26, 1956 — M. W. CARLSON — 2,752,455
THERMAL RESPONSIVE CONTROL DEVICE
Filed Jan. 25, 1954
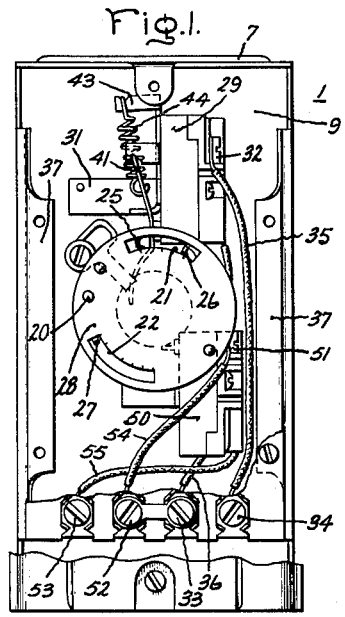
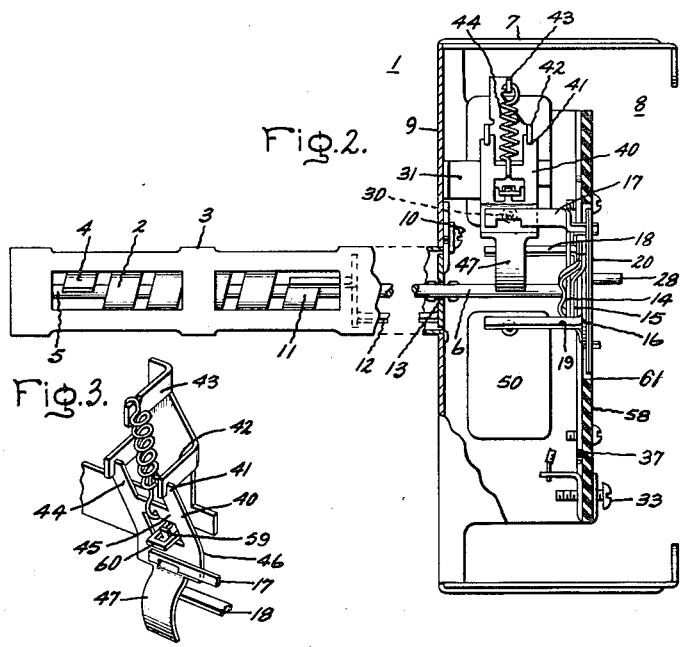
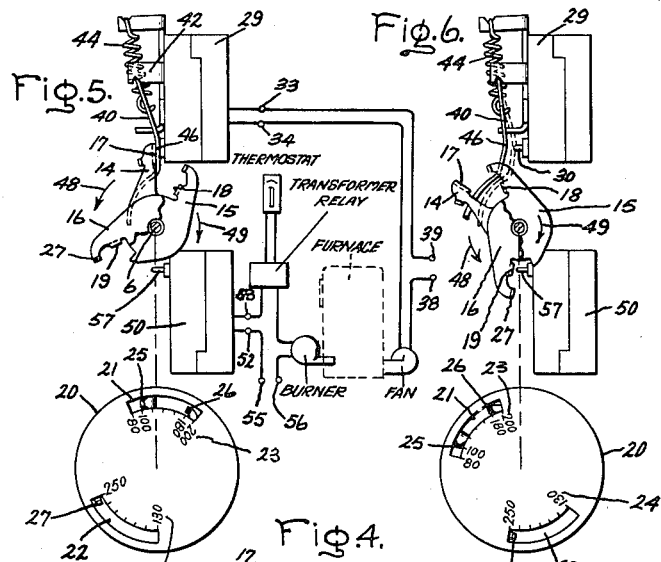
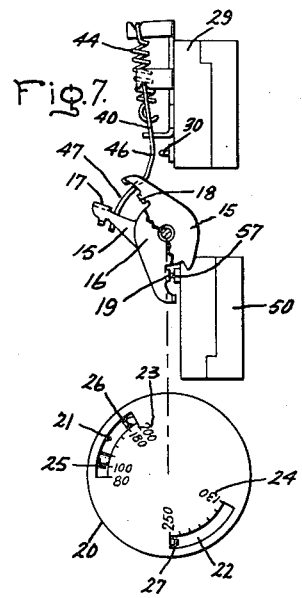
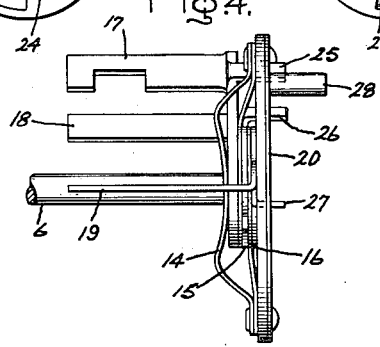
Inventor:
Morris W. Carlson,
by His Attorney.

2,752,455
THERMAL RESPONSIVE CONTROL DEVICE

Morris W. Carlson, Morrison, Ill., assignor to General Electric Company, a corporation of New York Application January 25, 1954, Serial No. 405,952

11 Claims. (Cl. 200—138)

This invention relates to thermal responsive control devices of the type generally used in connection with domestic warm air furnaces, and has particular reference to the operating mechanisms thereof.

Conventional domestic warm air furnace systems include in addition to the burner and combustion chamber, a thermostat located in the area to be heated and a fan associated with the furnace for circulating the warm air throughout the area. The thermostat is arranged to start the burner responsive to the temperature in the area to be heated falling to a predetermined level. However, it is not desirable that the fan be turned on until the temperature of the air in the furnace plenum chamber has reached a higher predetermined level. The thermostat will, of course, normally turn off the burner when the temperature of the area to be heated has risen to the desired level. However, for greatest fuel economy it is desirable that the fan continue to run to exhaust the warm air from the furnace plenum chamber until the temperature therein has fallen to another predetermined lower level. It is therefore desirable to provide a device which will act in response to the temperature of the air in the furnace plenum chamber to turn on the fan when this temperature has risen to a first predetermined level, and to turn off the fan when the temperature falls to another predetermined lower level. In addition, it is desirable that this device also be arranged to turn off the burner at a predetermined upper temperature in the event that the thermostat in the area being heated fails to perform this function, or the furnace temperature exceeds a safe value.

Such a device is referred to as a warm air furnace fan and limit control and a specific form is shown and described in Patent 2,633,517 issued March 31, 1953, to Ralph W. Gustafson, and assigned to the assignee of the present application. The device of the aforesaid Gustafson patent incorporates a shaft connected to a helical bimetal member and arranged for rotational movement in either direction responsive to changes in the temperature of the bimetal. A pair of operating members are adjustably mounted on the shaft and are moveable therewith. A switch is provided adapted to be connected to the furnace and having a normal position and a second position. A cantilever spring actuating member is provided for the switch, this member being arranged to oppose the switch mechanism with such force that the switch will remain in either of its two positions to which it is moved by movement of the actuating member. A portion of the cantilever spring actuating member extends between the two operating members so that rotation of the shaft in one direction causes one of the members to engage with the actuating member to move the switch to one of its positions, and movement of the shaft in the other direction causes the other operating member to engage the switch actuating member to move the switch to the other of its two positions. A third operating member may be adjustably mounted on the shaft for actuating a second switch. Normally the first switch would be connected to operate the fan while the second switch would provide the upper temperature limit cutoff for the burner.

It has been found in practice that the cantilever spring switch actuating mechanism of the aforesaid Gustafson patent does not provide completely reliable operation and may fail after a relatively short period of time. It is therefore desirable to provide a thermal responsive control device of the general type shown in the aforesaid Gustafson patent which incorporates improved switch actuating means characterized by its simplicity, ease of assembly, and long and reliable operation.

It is therefore an object of this invention to provide an improved thermal responsive control device incorporating the desirable features set forth above.

This invention in its broadest aspects provides a thermal responsive control device having temperature sensing means adapted to be deflected in a response to temperature changes with a shaft member being connected thereto and arranged for rotational movement in response to deflection thereof. A pair of operating members are mounted on the shaft member and are moveable therewith. A switch is also provided adapted to be connected to the device being controlled and having a normal position and a second position. An actuating member is provided for the switch having two stable positions. For example, the actuating member may be biased into one or the other of its stable positions by an overcenter spring. This actuating member in its first position biases the switch into its second position and in its second position allows the switch to return to its normal position. One of the operating members engages the actuating member in its first position to move the same into its second position responsive to a predetermined movement of the shaft member in one direction, while the other of the operating members engages the actuating member in its second position to move the same to its first position responsive to a predetermined movement of the shaft member in the other direction.

Further objects and advantages of this invention will become apparent and the invention will be better understood by reference to the following description and the accompanying drawing; and the features of novelty which characterize this invention will be pointed out with particularity in the claims annexed to and forming a part of this specification.

In the drawing,

Fig. 1 is a front elevational view of the improved thermal control device of this invention;

Fig. 2 is a side elevational view, partly in section, showing the device of Fig. 1;

Fig. 3 is a fragmentary perspective view illustrating the improved switch operating mechanism of the invention;

Fig. 4 is a fragmentary side view of the operating arms of the device of the invention;

Fig. 5 is a schematic view showing the control device of this invention connected with a warm air furnace system prior to turning on the fan;

Fig. 6 is another schematic view showing the device after the fan has been turned on; and Fig. 7 shows the device actuating the upper temperature limit switch to turn off the burner.

Referring now to Figs. 1 and 2, there is shown a thermal responsive control device generally identified as 1. This device includes a helical bimetal element 2 enclosed in a tubular housing 3 and having its outer end 4 connected to the outer end 5 of shaft 6. Ordinarily, housing member 3, bimetal element 2, and end 5 of shaft member 6 extend into the warm air plenum of the furnace (not shown) through an opening in the wall thereof while enclosure 7 and the operating mechanism, generally identified as 8 enclosed therein, are positioned on the exterior of the furnace. Tubular housing 3 is rigidly secured to the backwall 9 of enclosure 7 by holding lugs on tube 3 formed against the inside surface of enclosure back 9, the inner end 11 of helical bimetal element 2 is also rigidly secured to the backwall 9 of the enclosure 7 by calibration adjusting screw 10 and connection 12. The shaft 6 extends through opening 13 in part 12 which is attached to backwall 9 of enclosure 7 which serves as a bearing for shaft 6. It will now be seen that with end 11 of helical bimetal element 2 firmly secured, changes in the temperature to which it is exposed will cause helical bimetal element 2 to either coil itself up more tightly or to uncoil thus causing shaft 6 to rotate in one direction or the other dependent upon the direction and amount of temperature change.

Referring now to Fig. 4 in addition to Figs. 1 and 2, shaft 6 has three operating members 14, 15 and 16 adjustably attached thereto so that the relative angular position of these members may be selectively changed; however, these members will normally move with shaft 6. The means of attachment of operating members 14 and 15 and 16 to shaft 6 to provide this adjustable feature are more fully shown and described in the aforesaid Gustafson patent. Operating members 14, 15 and 16 are respectively provided with operating arms 17, 18 and 19. These operating arms extend at right angles to the operating members 14, 15 and 16 in the same direction and parallel with shaft 6. It will be seen that operating arm 18 is closer to the shaft 6 than the operating arm 17.

Also attached to shaft 6 is dial 20 which rotates with shaft 6. Dial 20 is provided with two arcuate slots 21 and 22 with calibrated indicia 23 and 24 respectively associated therewith. Operating members 14 and 15 have adjusting lugs 25 and 26 respectively formed thereon and extending through opening 21 in dial 20 while operating member 16 has an adjusting lug 27 formed thereon and extending through arcuate slot 22. A holding lug 28 is mounted on the exterior of dial 20 so that the dial and shaft 6 can be manually held stationary in order to adjust the relative positions of operating members 14, 15 and 16 with respect to shaft 6 by means of lugs 25, 26 and 27.

A fan control switch 29 having an actuating button 30 is mounted in enclosure 7 and secured to the backwall 9 thereof by means of a bracket 31. The terminals 32 of switch 29 are connected to external terminals 33 and 34 by leads 35 and 36. External terminals 33 and 34 are mounted on insulating member 58 having an opening 61 formed therein surrounding dial 20. Insulating member 58 is secured to enclosure 7 by means of flanges 37 formed on the sides thereof. From Fig. 5 it will be seen that external terminals 33 and 34 are adapted to be connected in series with the fan of the furnace across power terminals 38 and 39. Fan switch 29 is preferably of the snap acting type having a normal position with the contacts closed and a second position with the contacts open. Here, the normal or contacts closed position is with actuating button 30 extended, as shown in Fig. 6 and the second, or contacts open position is with the actuating button 30 depressed, as shown in Fig. 5.

In order to actuate fan switch 29, a switch actuating member 40 is provided having its upper end 41 pivoted on bracket 42, as best seen in Fig. 3. Bracket 42 is secured to the backwall 9 of enclosure 7 and is also provided with an upper extension 43. An overcenter spring 44 connects bracket extension 43 to cross bar 45 of actuating member 40 and it is thus seen that switch actuating member 40 will have two stable positions, a first position as shown in Fig. 5 and a second position as shown in solid lines in Figs. 6 and 7 with the spring 44 biasing the actuating member 40 into one or the other of its stable positions. The mid portion 46 of switch actuating member 40 is adapted to engage actuating button 30 of fan switch 29 when the actuating member 40 is in its first position, as shown in Fig. 5, thus moving the actuating button to its second or contacts open position. When the switch actuating member 40 is in its second position, as shown in Fig. 6 switch actuating button 30 is allowed to return to its normal or contacts closed position.

The lower end 47 of switch actuating member 40 is curved, as best seen in Fig. 3, the radius of this curvature being substantially taken from the center of shaft 6 when the actuating member 40 is in its second position, as shown in Fig. 6 and Fig. 7. In addition, the distance from shaft 6 to curved end 47 of actuating member 40, when the actuating member is in its second position as shown in Figs. 6 and 7, is such that curved end 47 will not touch arms 17 and 18 when bimetal 2 rotates the arm assembly to operate limit switch 50. Curved end 47 is held in this position by spring 44 holding tab 59 against stop 60.

The purpose of curved end 47 is to prevent actuating member 40 from returning to its first stable position when operating arm 18 has moved past the fan—on position. This might otherwise occur if the control were sufficiently jarred while in the above position.

In operation, assuming that operating arms 14 and 15 have been positioned as shown in Fig. 5 and that the furnace is cold, operating member 17 will be engaging actuating member 40 to depress the switch actuating button 30 thus opening the contacts of the fan switch 29 so that the furnace fan will not be operating. Assuming that the thermostat now calls for increased heat and thus turns on the burner, as the temperature of the warm air in the furnace increases, bimetal element 2 will be deflected thus rotating shaft 6 and rotating operating arms 14 and 15 to the left in the directions shown by the arrow 48. When the temperature of the warm air reaches a predetermined amount, as determined by the position of operating member 15, operating arm 18 will engage actuating member 40, as shown in dotted lines in Fig. 6, thus urging actuating member 40 to the left, moving actuating button 30 to the operating point which closes the contacts of fan switch 29, thus energizing the fan. If the temperature continues to rise, arm 18 will push actuating member 40 overcenter and spring 44 will move tab 59 to stop 60. This condition allows the arm assembly to continue to rotate unimpeded. Assuming the temperature in the area to be heated rises a sufficient amount so that the thermostat will turn off the burner, the warm air temperature in the furnace will thus begin to fall causing bimetal element 2 to move shaft 6 and operating member 14 and 15 to the right as shown in Figs. 5 and 6 in the direction of arrow 49. When the air in the furnace has cooled down to a predetermined degree, as determined by the setting of operating member 14, operating arm 17 will engage actuating member 40 urging it toward the right as viewed in Figs. 5 and 6 until it depresses actuating button 30 to the operating point which opens contacts of fan switch 29, thus opening the circuit of the fan. This restores the mechanism to its initial position as viewed in Fig. 5.

The actuating arm 40 operates to hold button 30 down after operating arm 17 has moved button 30 down to the contacts open operating point. When operating arm 18 has moved actuating arm 40 out to the contacts closed operating point of button 30, actuating arm 40 will move out until tab 59 comes against stop 60, or against arm 17, whichever is the nearest. If not overcenter, actuating arm 40 may continue to rest against arm 18 until it goes overcenter. Actuating arm 40 does not exert enough force to push button 30 down until after button 30 has been depressed past the contacts open operating point. This is due to the force differential characteristic of the switch 29.

Assuming that the thermostat fails to turn off the burner or that for some reason that the warm air temperature in the furnace approaches a dangerous value, it is desirable that means be provided for shutting off the burner at the furnace. To accomplish this, a second switch 50 is mounted in enclosure 7 and has its terminals 51 connected to external terminals 52 and 53 by means of leads 54 and 55. As shown in Fig. 5 external terminals 52 and 53 are conventionally connected in circuit with the room thermostat, a transformer relay and thermal timer, and the burner across power terminals 55 and 56. Switch 50 is also of the snap acting type and is arranged so that in its normal position as shown in Figs. 5 and 6 with its actuating button 57 in the extended position, its contacts are closed and with its actuating button 57 in the depressed position as shown in Fig. 7, its contacts are open. Operating arm 19 of operating member 16 is arranged to engage actuating button 57 of upper temperature limit switch 50 and thus when the warm air temperature in the furnace reaches a predetermined upper temperature, as determined by the setting of operating member 16, operating arm 19 will depress actuating button 57 of switch 50 thus moving it to its second position opening its contacts and thus opening the circuit of the burner.

It is thus seen that the fan switch 29 is given two stable positions, i. e., contacts open and contacts closed by a simple overcenter actuating member which is easy to assemble, and not subject to fatigue. It is moved from one stable position to the other by the action of operating arms 17 and 18.

While a helical bimetal element 2 is shown, it will be readily understood that any temperature sensing means adapted to be deflected in response to temperature changes can be utilized in this improved device. Switches suitable for use as fan switch 29 and the upper temperature switch 50 are shown in Patent 2,429,813 issued October 28, 1947 to George M. Hausler and assigned to the assignee of the present application.

While I have shown and described a particular embodiment of this invention, further modifications and improvements will occur to those skilled in the art. I desire it to be understood therefore that this invention is not limited to the form shown and I intend in the appended claims to cover all modifications which do not depart from the spirit and scope of this invention.

What I claim as new and desire to secure by Letters Patent of the United States is:

1. A thermal responsive control device comprising temperature sensing means adapted to be deflected in response to temperature changes, a shaft member connected to said temperature sensing means and arranged for rotational movement in response to deflection thereof, a pair of operating members mounted on said shaft member and moveable therewith, a switch adapted to be connected to the apparatus to be controlled and having a normal position and a second position, and an actuating member for said switch having two stable positions, said actuating member in its first position holding said switch in its second position and in its second position allowing said switch to return to its normal position, one of said operating members engaging said actuating member in its first position and moving the same into its second position responsive to a predetermined movement of said shaft member in one direction, the other of said operating members engaging said actuating member in its second position and moving the same to its first position responsive to a predetermined movement of said shaft member in the other direction.

2. A thermal responsive control device comprising temperature sensing means adapted to be deflected in response to temperature changes, a shaft member connected to said temperature sensing means and arranged for rotational movement in response to deflection thereof, a pair of operating members mounted on said shaft member and moveable therewith, a switch adapted to be connected to the apparatus to be controlled and having a normal position and a second position, and an overcenter actuating member for said switch having two stable positions, said actuating member in its first position holding said switch in its second position and in its second position allowing said switch to return to its normal position, one of said operating members engaging said actuating member in its first position and moving the same overcenter into a second position responsive to a predetermined movement of said shaft member in one direction, the other of said operating members engaging said actuating member in its second position and moving the same overcenter into its first position responsive to a predetermined movement of said shaft member in the other direction.

3. A thermal responsive control device comprising temperature sensing means adapted to be deflected in response to temperature changes, a shaft member connected to said temperature sensing means and arranged for rotational movement in response to deflection thereof, a pair of operating members mounted on said shaft member and moveable therewith, a switch adapted to be connected to the apparatus to be controlled and having a normal position and a second position, an actuating member for said switch having two stable positions, and overcenter means biasing said actuating member into one or the other of its two positions, said actuating member in its first position holding said switch in its second position and in its second position allowing said switch to return to its normal position, one of said operating members engaging said actuating member in its first position and moving the same overcenter into its second position responsive to a predetermined movement of said shaft member in one direction, the other of said operating members engaging said actuating member in its second position and moving the same overcenter into its first position responsive to a predetermined movement of said shaft member in the other direction.

4. A thermal responsive control device comprising temperature sensing means adapted to be deflected in response to temperature changes, a shaft member connected to said temperature sensing means and arranged for rotational movement in response to deflection thereof, a pair of spaced apart operating members mounted on said shaft member and moveable therewith, a switch adapted to be connected to the apparatus to be controlled and having a normal position and a second position, an actuating member for said switch having two stable positions, said actuating member being pivoted at one end, and overcenter means biasing said actuating member into one or the other of its two positions, said actuating member in its first position holding said switch in its second position and in its second position allowing said switch to return to its normal position, said actuating member having its other end positioned between said operating members, one of said operating members engaging said actuating member in its first position and moving the same overcenter into its second position responsive to a predetermined movement of said shaft member in one direction, the other of said operating members engaging said actuating member in its second position and moving the same overcenter into its first position responsive to a predetermined movement of said shaft member in the other direction.

5. A thermal responsive control device comprising temperature sensing means adapted to be deflected in response to temperature changes, a shaft member connected to said temperature sensing means and arranged for rotational movement in response to deflection thereof, a pair of operating members adjustably mounted on said shaft member and movable therewith, a snap acting switch adapted to be connected to the apparatus to be controlled and having a normal position and a second position, an actuating member for said switch having two stable positions, and an overcenter spring biasing said actuating member into one or the other of its two positions, said actuating member in its first position holding said switch in its second position and in its second position allowing said switch to return to its normal position, one of said operating members engaging said actuating member in its first position and moving the same overcenter into its second position responsive to a predetermined movement of said shaft member in one direction, the other of said operating members engaging said actuating member in its second position and moving the same overcenter into its first position responsive to a predetermined movement of said shaft member in the other direction.

6. A thermal responsive control device comprising temperature sensing means adapted to be deflected in response to temperature changes, a shaft member connected to said temperature sensing means and arranged for rotational movement in response to deflection of said temperature sensing means, a pair of operating members adjustably mounted on said shaft member and moveable therewith, said operating members respectively having operating arms, a snap acting switch adapted to be connected to the apparatus to be controlled and having a normal position and a second position, an actuating member for said switch having two stable positions, and an overcenter spring biasing said actuating member into one or the other of its two positions, said actuating member in its first position holding said switch in its second position and in its second position allowing said switch to return to its normal position, one of said operating arms engaging said actuating member in its first position and moving the same overcenter into its second position responsive to a predetermined movement of said shaft member in one direction, the other of said operating arms engaging said actuating member in its second position and moving the same overcenter into its first position responsive to a predetermined movement of said shaft member in the other direction.

7. A thermal responsive control device comprising temperature sensing means adapted to be deflected in response to temperature changes, a shaft member connected to said temperature sensing means and arranged for rotational movement in response to deflection thereof, a pair of operating members adjustably mounted on said shaft member and movable therewith, said operating members respectively having operating arms extending at right angles thereto in the same direction and substantially parallel with said shaft, a snap acting switch adapted to be connected to the apparatus to be controlled and having a normal position and a second position, an actuating member for said switch having two stable positions, and an overcenter spring biasing said actuating member into one or the other of its two positions, said actuating member in its first position holding said switch in its second position and in its second position allowing said switch to return to its normal position, one of said operating arms engaging said actuating member in its first position and moving the same overcenter into its second position responsive to a predetermined movement of said shaft member in one direction, the other of said operating arms engaging said actuating member in its second position and moving the same overcenter into its first position responsive to a predetermined movement of said shaft member in the other direction.

8. A thermal responsive control device comprising temperature sensing means adapted to be deflected in response to temperature changes, a shaft member connected to said temperature sensing means and arranged for rotational movement in response to deflection thereof, a pair of operating members adjustably mounted on said shaft member and movable therewith, said operating members respectively having operating arms extending at right angles thereto in the same direction and substantially parallel with said shaft, the operating arm of one of said operating members being closer to said shaft than the operating arm of the other of said operating members, a snap acting switch adapted to be connected to the apparatus to be controlled and having a normal position and second position, an actuating member for said switch having two stable positions, and an overcenter spring biasing said actuating member into one or the other of its two positions, said actuating member in its first position holding said switch in its second position and in its second position allowing said switch to return to its normal position, one of said operating arms engaging said actuating member in its first position and moving the same overcenter into its second position responsive to a predetermined movement of said shaft member in one direction, the other of said operating arms engaging said actuating member in its second position and moving the same overcenter into its first position responsive to a predetermined movement of said shaft member in the other direction.

9. A thermal responsive control device comprising temperature sensing means adapted to be deflected in response to temperature changes, a shaft member connected to said temperature sensing means and arranged for rotational movement in response to deflection thereof, a pair of operating members adjustably mounted on said shaft member and movable therewith, said operating members respectively having operating arms extending at right angles thereto in the same direction and substantially parallel with said shaft, the operating arm of one of said operating members being closer to said shaft than the operating arm of the other of said members, a snap acting switch adapted to be connected to the apparatus to be controlled and having a normal position and a second position, an actuating member for said switch having two stable positions, said actuating member being pivoted at one end, and an overcenter spring biasing said actuating member into one or the other of its two positions, said actuating member in its first position holding said switch in its second position and in its second position allowing said switch to return to its normal position, said actuating member having its other end positioned between said operating arms, said one operating arm engaging said other end of said actuating member in its first position and moving the same overcenter into its second position responsive to a predetermined movement of said shaft member in one direction, the other of said operating arms engaging said other end of said actuating member in its second position and moving the same overcenter into its first position responsive to a predetermined movement of said shaft member in the other direction.

10. A thermal responsive control device comprising temperature sensing means adapted to be deflected in response to temperature changes, a shaft member connected to said temperature sensing means and arranged for rotational movement in response to deflection thereof, a pair of operating members adjustably mounted on said shaft member and moveable therewith, said operating members respectively having operating arms extending at right angles thereto in the same direction and substantially parallel with said shaft, the operating arm of one of said operating members being closer to said shaft than the operating arm of the other of said members, a snap acting switch adapted to be connected to the apparatus to be controlled and having a normal position and a second position, an actuating member for said switch having two stable positions, said actuating member being pivoted at one end, and an overcenter spring biasing said actuating member into one or the other of its stable positions, said actuating member in its first position holding said switch in its second position and in its second position allowing said switch to return to its normal position, said actuating member having its other end positioned between said operating arms, said other end of said actuating member being curved, said curve having a radius taken from said shaft when said actuating member is in its second position, said radius being such that said curved end of said operating arm will not touch either of said operating arms, said one operating arm engaging said other end of said actuating member in its first position and moving the same overcenter into its second position responsive to a predetermined movement of said shaft member in one direction, said curved end of said actuating member in its second position permitting said one operating arm to move further in response to further movement of said shaft member, the other of said operating arms engaging said other end of said actuating member in its second position and moving the same overcenter into its first position responsive to a predetermined movement of said shaft member in the other direction.

11. A thermal responsive control device comprising temperature sensing means adapted to be deflected in response to temperature changes, a shaft member connected to said temperature sensing means and arranged for rotational movement in response to deflection of said temperature sensing means, a pair of operating members adjustably mounted on said shaft member and moveable therewith, said operating members respectively having operating arms extending at right angles thereto in the same direction and substantially parallel with said shaft, the operating arm of one of said operating members being closer to said shaft than the operating arm of the other of said members, a snap acting switch adapted to be connected to the apparatus to be controlled having a push button actuator with a normal position and a second depressed position, an actuating member for said switch having two stable positions, said actuating member being pivoted at one end, and an overcenter spring biasing said actuating member into one or the other of its two positions, said actuating member in its first position having its mid-portion engaging said switch actuator to hold the same in its second position and in its second position allowing said switch actuator to return to its normal position, said actuating member having its other end positioned between said operating arms, said other end of said actuating member being curved, said curve having a radius taken from said shaft when said actuating member is in its second position, said radius being such that said curved end of said operating arm will not touch either of said operating arms, said one operating arm engaging said other end of said actuating member in its first position and moving the same overcenter into its second position responsive to a predetermined movement of said shaft member in one direction, said curved end of said actuating member in its second position permitting said one operating arm to move further in response to further movement of said shaft member, the other of said operating arms engaging said other end of said actuating member in its second position and moving the same overcenter into its first position responsive to a predetermined movement of said shaft member in the other direction.

References Cited in the file of this patent
UNITED STATES PATENTS

| | | |
|---|---|---|
| Re. 22,131 | Lindemann | July 7, 1942 |
| 2,158,437 | Shaw | May 16, 1939 |
| 2,204,231 | Rudolph | June 11, 1940 |
| 2,490,073 | Malone | Dec. 6, 1949 |
| 2,532,383 | White | Dec. 5, 1950 |
| 2,633,517 | Gustafson | Mar. 31, 1953 |